United States Patent
Andress et al.

(10) Patent No.: US 6,574,748 B1
(45) Date of Patent: Jun. 3, 2003

(54) FAST RELIEF SWAPPING OF PROCESSORS IN A DATA PROCESSING SYSTEM

(75) Inventors: Sidney L. Andress, Glendale, AZ (US); Curtis D. Andes, Phoenix, AZ (US); Gerald E. Rightnour, Phoenix, AZ (US); James R. Smith, Phoenix, AZ (US)

(73) Assignee: Bull HN Information Systems Inc., Billerica, MA (US)

( * ) Notice: Subject to any disclaimer, the term of this patent is extended or adjusted under 35 U.S.C. 154(b) by 386 days.

(21) Appl. No.: 09/596,539

(22) Filed: Jun. 16, 2000

(51) Int. Cl.[7] .................................................. H02H 3/05
(52) U.S. Cl. .......................................... 714/11; 714/13
(58) Field of Search .............................. 714/11, 10, 13, 714/3, 7, 8; 710/302; 712/227; 711/153

(56) References Cited

U.S. PATENT DOCUMENTS

| | | | | |
|---|---|---|---|---|
| 5,327,553 A | * | 7/1994 | Jewett et al. .................... 714/3 |
| 5,408,649 A | * | 4/1995 | Beshears et al. ............ 707/204 |
| 5,495,569 A | * | 2/1996 | Kotzur .......................... 714/10 |
| 5,627,962 A | * | 5/1997 | Goodrum et al. ............. 714/13 |
| 5,862,312 A | * | 1/1999 | Mann et al. ................. 711/114 |
| 5,983,359 A | * | 11/1999 | Nota et al. ..................... 714/10 |
| 5,996,089 A | * | 11/1999 | Mann et al. ................. 370/244 |
| 6,115,829 A | * | 9/2000 | Slegel et al. ................. 712/227 |
| 6,158,015 A | * | 12/2000 | Klein ........................... 710/302 |
| 6,189,112 B1 | * | 2/2001 | Slegel et al. ................... 714/10 |

* cited by examiner

Primary Examiner—Dieu-Minh Le
(74) Attorney, Agent, or Firm—J. S. Solakion; B. E. Hayden (57) ABSTRACT

In a data processing system with multiple processors, failing processors are replaced with spare processors. This allows the system to continue to operate without degradation. An intercept process is notified of a processor failure so that it can collect processor registers and states. If the registers and states are collected correctly, an indication is set that relief is possible. The intercept process notifies a service processor of the failure and then halts the failed processor. The service processor then notifies the operating system of the failure and that relief is possible. If fast relief is acceptable, a spare processor is initialized and resumes execution with the state and registers of the failed processor. A service processor modeling file controls the number of active and spare processors in a system. Spare processors sharing the same L2 cache with the failed processor are preferred as replacements.

19 Claims, 5 Drawing Sheets

FAST RELIEF SWAPPING OF PROCESSORS IN A DATA PROCESSING SYSTEM

FIELD OF THE INVENTION

This invention relates to computer central processors and, more particularly, the swapping of physical processors when one is found defective without having to reboot the operating system.

BACKGROUND OF THE INVENTION

As personal computers and workstations have become more and more powerful, makers of mainframe computers have undertaken to provide features which cannot readily be matched by these smaller machines in order to stay viable in the market place. One such feature may be broadly referred to as fault tolerance which means the ability to withstand and promptly recover from hardware faults and other faults without the loss of crucial information. The central processing units (CPUs) of mainframe computers typically have error and fault detection circuitry, and sometimes error recovery circuitry, built in at numerous information transfer points in the logic to detect and characterize any fault which might occur.

The CPU(s) of a given mainframe computer comprises many registers logically interconnected to achieve the ability to execute the repertoire of instructions characteristic of the CPU(s). In this environment, the achievement of genuinely fault tolerant operation, in which recovery from a detected fault can be instituted at a point in a program immediately preceding the faulting instruction/operation, requires that one or more recent copies of all the software visible registers (and supporting information also subject to change) must be maintained and constantly updated. This procedure is typically carried out by reiteratively sending copies of the registers and supporting information (safestore information) to a special, dedicated memory or memory section.

When a fault occurs and analysis determines that recovery is possible, the safestore information is used to reestablish the software visible registers in the CPU with the contents held recently before the fault occurred so that restart can be instituted or tried from the corresponding place in program execution.

Typically, when one processor in a data processing system fails, at best, the process running on that processor is aborted. In many cases, including the case where the operating system (OS) had control of the processor when it crashed, the entire operating system crashes. When the system recovers, typically after a reboot, it will run in degraded mode, with that failed processor being disabled until it can be replaced or repaired. Obviously, if this is the only processor in the data processing system, the system is down until the repair or replacement can be accomplished. In all cases though, the loss of that failed processor results in degraded performance.

It would be advantageous then for a data processing system to be able to recover from the failure of a single processor. In particular, it would be advantageous if the data processing system could recover so that no processes are lost nor is any performance lost.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DETAILED DESCRIPTION

In a data processing system with multiple processors, failing processors are replaced with spare processors. This allows the system to continue to operate without degradation. An intercept process is notified of a processor failure so that it can collect processor registers and states. If the registers and states are collected correctly, an indication is set that relief is possible. The intercept process notifies a service processor of the failure and then halts the failed processor. The service processor then notifies the operating system of the failure and that Relief is possible. If Fast Relief is acceptable, a spare processor is initialized and resumes execution with the state and registers of the failed processor. A service processor modeling file controls the number of active and spare processors in a system. Spare processors sharing the same L2 cache with the failed processor are preferred as replacements.

In the following description, numerous specific details are set forth such as specific word or byte lengths, etc. to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. Moreover, if the logically true state is a logic level zero, the logically false state will be a logic level one.

Figure 1:
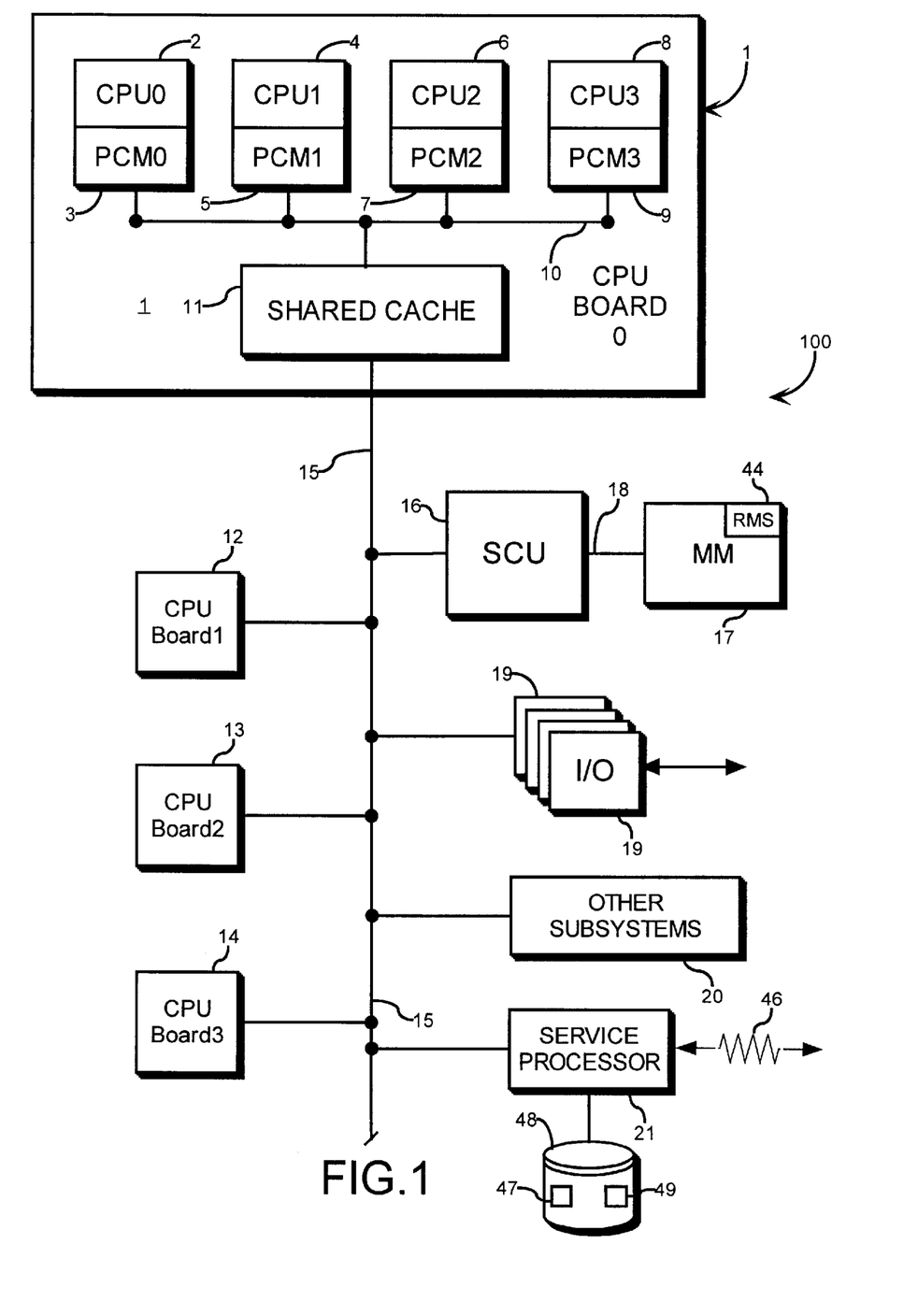
FIG. 1 is a high level block diagram of a multiprocessor computer system which is an exemplary environment for practicing the invention.

Attention is first directed to FIG. 1 which is a high level block diagram of an exemplary multiprocessor computer system incorporating the invention. A first CPU board (CPU Board "0") 1 includes four central processor units 2 (CPU "0"), 4 (CPU "1"), 6 (CPU "2"), 8 (CPU "3"). Each of the central processor units 2, 4, 6, 8 situated on the first CPU board 1 includes an integral private cache memory module, 3, 5, 7, 9, respectively. The private cache modules 3, 5, 7, 9 are each configured as "store into"; i.e., the results of each completed operation performed in the CPU are stored into the private cache. Each of the private cache modules 3, 5, 7, 9 on CPU Board "0" 1 interface with a CPU bus 10 for direct communications between the CPUs 2, 4, 6, 8.

In the exemplary system, there are three additional CPU boards 12 (CPU Board "1"), 13 (CPU Board "2") and 14 (CPU Board "3"), each of which is substantially identical to CPU board 1 although those skilled in the multiprocessor art will understand that each CPU board and each CPU on each of the boards is assigned a unique identification number to facilitate communication and cooperation among the CPUs in the system.

CPU board 1 (i.e., CPU Board "0") also includes a shared cache 11 disposed between ("bridging") the CPU bus 10 and a system bus 15. It will be understood that each of the CPU boards 12, 13, 14 also each includes a CPU bus and a shared cache, identically oriented.

A system control unit ("SCU") 16 serves to couple the system bus 15 to a main memory unit 17 via a memory bus 18. The main memory unit 18 includes a Reserved Memory Space ("RMS") 44, which will be discussed further below. In addition, one or more input/output ("I/O") units 19 interface the system bus 15 with various input/output subsystems, not shown, to achieve input/output functions on a system basis, all as well known to those skilled in the art. Similarly, other subsystems 20, not otherwise specified or shown, may be connected to the system bus 15 to complete a given multiprocessor system. System control unit 16 also conventionally provides a multi-phase clock to all the system units requiring a common clock source.

Also coupled to the system bus 15 is a Service Processor ("SP") 21, which is typically a commercial personal computer or workstation, serves not only as a system and maintenance console, but also is used to boot the system and is employed extensively in analyzing and processing faults. Relevant to the present invention, the SP 21 has one or more disk drives 48 containing a plurality of files 47, 49. Two of these files are of primary importance to this invention. One of files is a configuration file 47 that among other things contains the current configuration of the system, including the status of all processors in the system. Also, there is a log file 49 that the SP 21 utilizes to log errors and events that occur in the system. The SP 21 also has a modem coupled to a communications link 46 that it utilizes to Auto Call the system vendor to report system errors and events.

Figure 2:
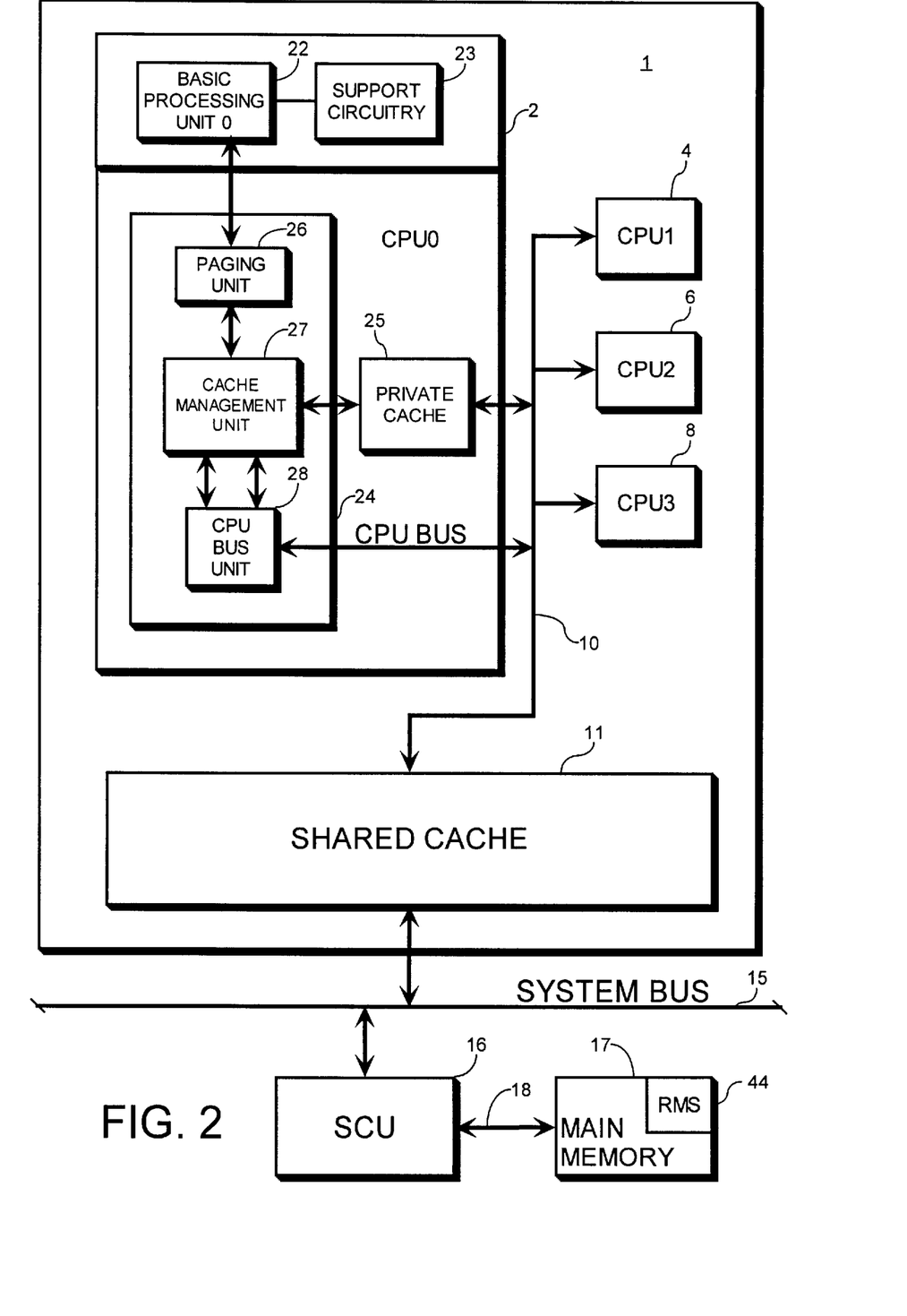
FIG. 2 is a slightly lower level block diagram showing additional details of an exemplary CPU board in the multiprocessor system of FIG. 1.

FIG. 2 is a slightly lower level block diagram of CPU "0" 2 of CPU board 1 (CPU Board "0") illustrating additional structure which is present in each CPU in the system. CPU "0" 2 includes a basic processing unit 22 and support circuitry 23 therefor.

As previously described, CPU "0" 2 also includes private cache module "0" 3 which constitutes a cache control unit 24 and a private cache 25 (which itself includes additional logic to be described below). Cache control unit 24 includes paging unit 26, cache management unit 27 and CPU bus unit 28. Paging unit 26 interfaces with basic processing unit "0" 22 and cache management unit 27. Cache management unit 27 also interfaces with private cache memory 25 and CPU bus unit 28. CPU bus unit also interfaces with CPU bus 10 and, via CPU bus 10, shared cache 11. Private cache 25 is also coupled directly to receive information from and send information to the CPU bus 10 and to receive information from and send information to basic processing unit "0" 22.

As previously described, shared cache 11 also interfaces with system bus 15 and, via system bus 15, with system control unit 16 and other systems/subsystems shown in FIG. 1. Main memory 17, including Reserve Memory Space 44, may be accessed via the system control unit 16 and memory bus 18.

It will be seen that there are numerous paths for information flow among the various blocks shown in FIGS. 1 and 2. The types of information may include control, address, instructions, and operands. A given CPU may directly access its own private cache module and indirectly access the private cache modules incorporated into the other CPUs on a shared CPU board. Thus, CPU "0" 2 can access, via the CPU bus 10, the shared cache 11 it shares with CPU "1" 4, CPU "2" 6 and CPU "3" 8. CPU "0" 2 can also, under defined conditions, access the private cache module of CPU "2" 6 (for example) via the CPU bus 10 to effect a local "siphon". Further, CPU "0" 2 can access (via CPU bus 10, shared cache 11 and system bus 15) the shared caches (not shown) on each of CPU Board "1" 12, CPU Board "2" 13 and CPU Board "3" 14. Still further, a given CPU may indirectly access the private cache modules (not shown) of a CPU (not shown) on another CPU board; e.g., CPU "0" 2 on CPU board 1 (CPU Board "0") may, under defined conditions, access the private cache module of any one of the CPUs on CPU Board "2" 13 (FIG. 1) via CPU bus 10, shared cache 11, system bus 15 and the shared cache on CPU Board "2" to effect a remote "siphon".

Further yet, for example, CPU "0" 2 can access main memory 17, including RMS 44, via CPU bus 10, shared cache 11, system bus 15, SCU 16 and memory bus 18. Still further, for example, CPU "0" 2 can access, via CPU bus 10, shared cache 11 and system bus 15, any other block shown coupled to the system bus 15 in FIG. 1 to achieve bilateral communication with input/output devices, other subsystem components and even other multiprocessor systems.

Figure 3:
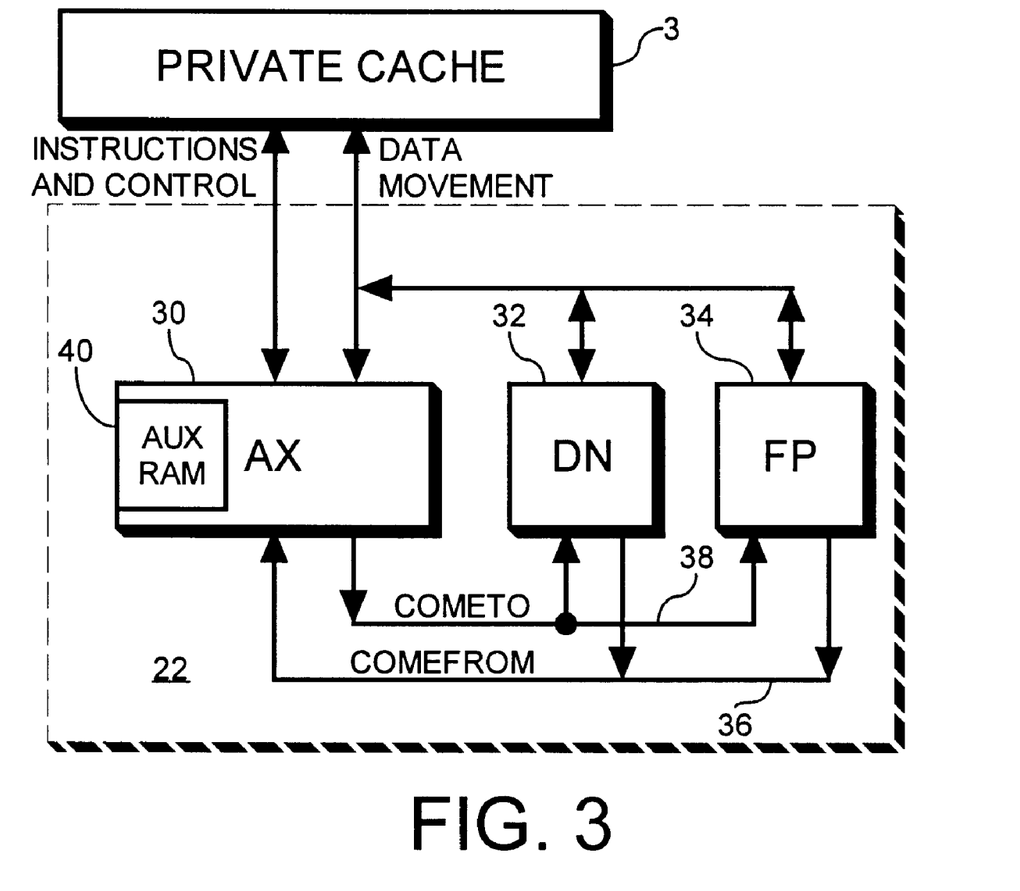
FIG. 3 is a block diagram showing additional details of a basic processing unit including within each CPU on the CPU board shown in FIG. 2.

FIG. 3 is a block diagram which includes additional details of a basic processing unit 22 in a system incorporating the present invention. The Address and Execution (AX) unit 30 is a microprocessing engine which performs all address preparation and executes all instructions except decimal arithmetic, binary floating point and multiply/divide instructions. The main functions performed by the AX unit 30 include: effective and virtual address formation; memory access control; security checks; register change/use control; execution of basic instructions, shift instructions, security instructions, character manipulation and miscellaneous instructions; and CLIMB safestore file.

Efficient scientific calculation capability is implemented in the Floating Point (FP) coprocessor unit 34. The FP unit 34 executes all binary floating point arithmetic. This unit, operating in concert with the AX unit 30, performs scalar or vector scientific processing. The FP unit 34: executes all binary and fixed and floating point multiply and divide operations; computes 12 by 72-bit partial products in one machine cycle; computes eight quotient bits per divide cycle; performs modulo 15 residue integrity checks; executes all floating point mantissa arithmetic; executes all exponent operations in either binary or hexadecimal format; preprocesses operands and post-processes results for multiply and divide instructions; and provides indicator and status control.

The DN unit 32 performs the execution of decimal numeric Extended Instruction Set (EIS) instructions. It also executes Decimal-to-Binary (DTB), Binary-to-Decimal (BTD) conversion EIS instructions and Move-Numeric-Edit (MVNE) EIS instructions in conjunction with the AX unit 30. The DN unit both receives operands from and sends results to the private cache 3. A COMTO ("command to") bus 38 and a COMFROM ("command from") bus 36 couple together the AX unit 30,the DN unit 32 and the FP unit 34 for certain interrelated operations.

The AX unit 30 includes an auxiliary random access memory 40 which is used to store safestore (and other) information. Thus, the contents of the auxiliary RAM 40 are constantly updated with, for example, duplicates of the contents of software visible registers and other relevant information subject to change (collectively, the SafeStore Frame or "SSF") such that, in the event of the occurrence of a fault from which recovery has been determined to be possible, processing may be restarted at a point just prior to the fault by transferring the most recent register set stored in the auxiliary RAM 40 back to reestablish the register set.

The straightforward use of a safestore is known in the prior art as exemplified by U.S. Pat. No. 5,276,862, entitled "SAFESTORE FRAME IMPLEMENTATION IN A CENTRAL PROCESSOR" by Lowell D. McCulley et al; U.S. Pat. No. 5,553,232, entitled "AUTOMATED SAFESTORE STACK GENERATION AND MOVE IN A FAULT TOLERANTCENTRAL PROCESSOR" by John E. Wilhite et al; and U.S. Pat. No. 5,557,737 entitled "AUTOMATED SAFESTORESTACK GENERATION AND RECOVERY IN A FAULT TOLERANT CENTRAL PROCESSOR" by John E. Wilhite et al, all incorporated by reference herein for their disclosure of the repetitive storage of safestore information in a safestore memory and the use of safestore information in recovery from a fault.

The Intercept Process is more fully described in U.S. Pat. No. 5,862,308 Entitled "FAULT INTERCEPT AND RESOLUTION PROCESS INDEPENDENT OF OPERATING SYSTEM" by Sidney L. Andress et al., incorporated herein by reference. It provides a fault preprocessor that can review fault situations and provide machine assembly language level assistance in managing system design problems. In the preferred embodiment of the Intercept Process is entered when the operating system in the failing processor 2 receives an instruction fault indicating that it is no longer fully functional. The Intercept Process performs proscribed actions for specified faults. In this case, the proscribed actions are those disclosed below.

In the past, when a processor 2 has a failure that requires it to be removed from the active processors in a system 100, the site would have to operate with one processor short until a new one is installed. Depending on the state of the process running in that failed processor, it may or may not continue to execute in the system.

The new generation of processor boards 1, 12, 13, 14, in the preferred embodiment can have from one through four processors 2, 4, 6, 8 on it. Future generations may have more. Due to the cost of manufacturing, it is now cost effective to provide limited options in actual physical configurations, such as: either two processors, or four processors on a processor board 1, regardless of how many processors a customer purchases. In many cases, there would thus be one or two spare processors in a customer's system. Replacing a failed processor with one of these spare processors will maintain a system 100 at a level that a customer has ordered and significantly reduce the need to rush a replacement processor board 1, 12, 13, 14 to the site.

Throughout the following disclosure, it is assumed solely as an example that the system 100 has at least one processor board 1 containing four processors 2, 4, 6, 8. Initially, it will be assumed that three of the processors 2, 4, 6 are "Assigned" to the operating system ("OS") and the fourth 8 is a "Released Spare" and not currently being utilized. Further, it is assumed that processor "0" 2 starts to fail and that it is replaced in accordance with this invention with processor "3" 8. These assumptions are for illustrative purposes only so that reference numbers can be assigned to processors in the following discussion.

Figure 4:
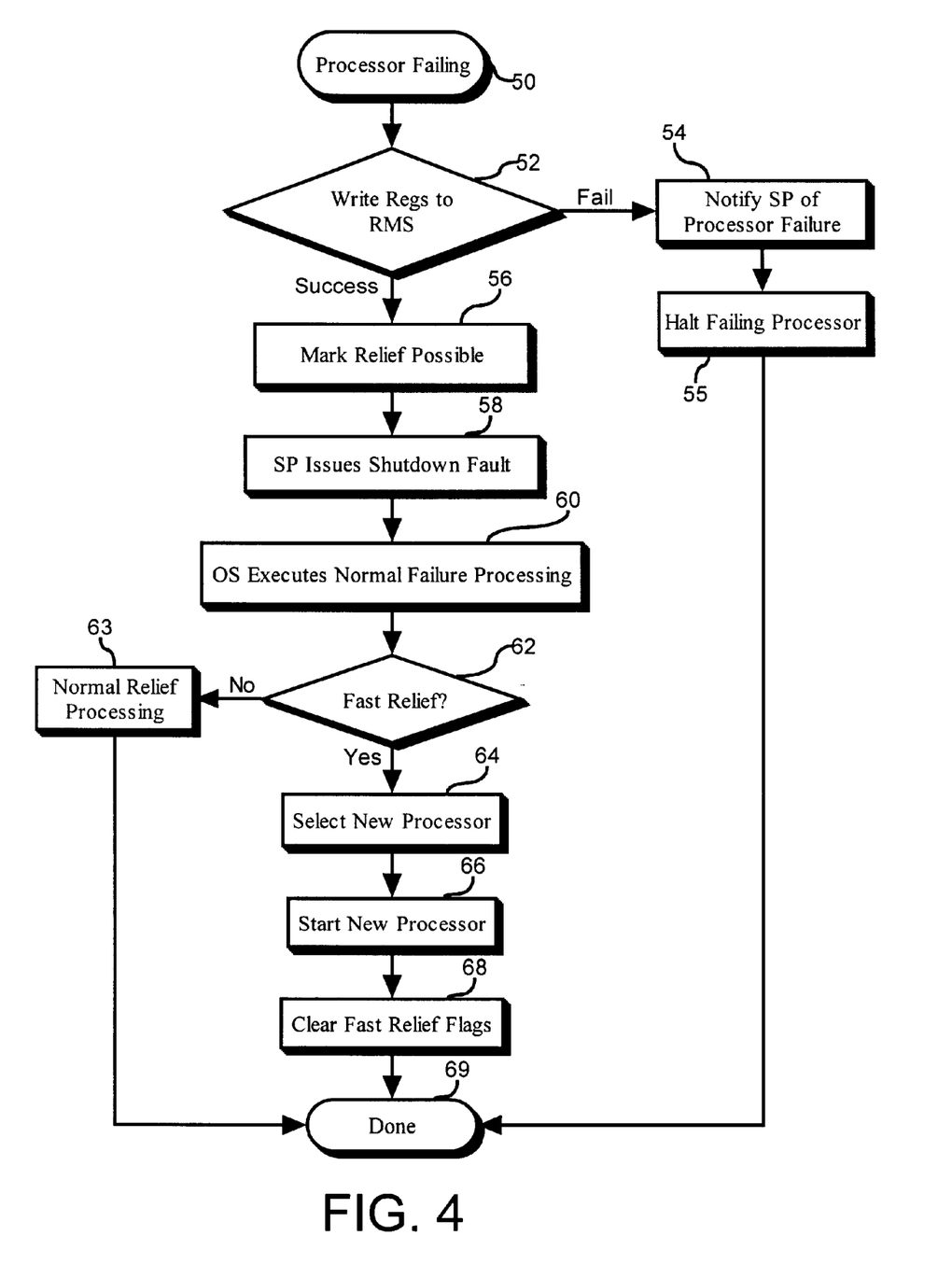
FIG. 4 is a block diagram illustrating processor failure processing, in accordance with a preferred embodiment of the present invention.

FIG. 4 is a block diagram illustrating processor failure processing, in accordance with a preferred embodiment of the present invention. When a processor 2 detects a hardware failure, step 50, the processor 2 attempts to collect its processor registers and state in an RMS 44 buffer set aside for error recovery for each processor possible in the system 100, step 52. This will preferably be in the form of a safestore stack frame. If the registers and processor state are successfully collected and written to its RMS 44 error recovery buffer, the RMS 44 is modified to indicate that "Relief" is possible, step 56. The Intercept Process in the failing processor then informs the Service Processor (SP) 21 of the processor failure.and then halts. The Service Processor 21 then issues a shutdown fault so that the operating system can complete the processor recovery processing.

The operating system will then execute normal processor failure processing up to the point where it determines if Relief is possible. When Relief is possible, a test is then made as to whether "Fast Relief" is requested. Testing will validate if the failed processor is acceptable for Fast Relief. If not, normal relief processing will be performed.

If Fast Relief is acceptable, the Service Processor 21 will select a replacement processor 8, step 64. The operating system will then update its tables to reflect the new physical processor 8 in place of the failed processor 2. The new processor 8 is then started with a "Connect" request from another processor, step 66. Once the replacement processor 8 has resumed execution as the failed processor 2, the RMS 44 "Fast Relief" table is cleared, step 68. If there are problems with Fast Relief, it will be abandoned, and the faulty processor 2 is just released. In any case, processing is now complete, step 69.

A modeling or configuration file 47 stored on disk 48 in the Service Processor 21 system controls the number of active processors within a system 100. All processors identified as "Assigned" or "Released Spare" will be initialized at system startup time. This will include connecting them to the shared cache bus 15. In the case where all the processors 2, 4, 6, 8 on a processor board 1 are identified as Released-Spare, these processors are initialized and placed in a "locked" condition. After processor initialization, the Assigned processors are "unlocked". If the active processor count exceeds the modeling file 47 count while unlocking a specified processor, it will have its state changed to Released-Spare. If an Assigned processor fails during initialization, a Released-Spare processor will be substituted, if available. The failing processor will then be marked as either "Released-Other" or "Released-Defective", and one of the Released-Spare processors will be assigned in its place, if available. In the preferred embodiment, it is preferred to use a Released-Spare processor 8 from the same processor board 1 if available. The configuration file 47 should reflect this change before RMS 44 is initialized. The Operating System is responsible for finding a newly assigned processor 8 and correctly mapping its physical and logical numbers.

Figure 5:
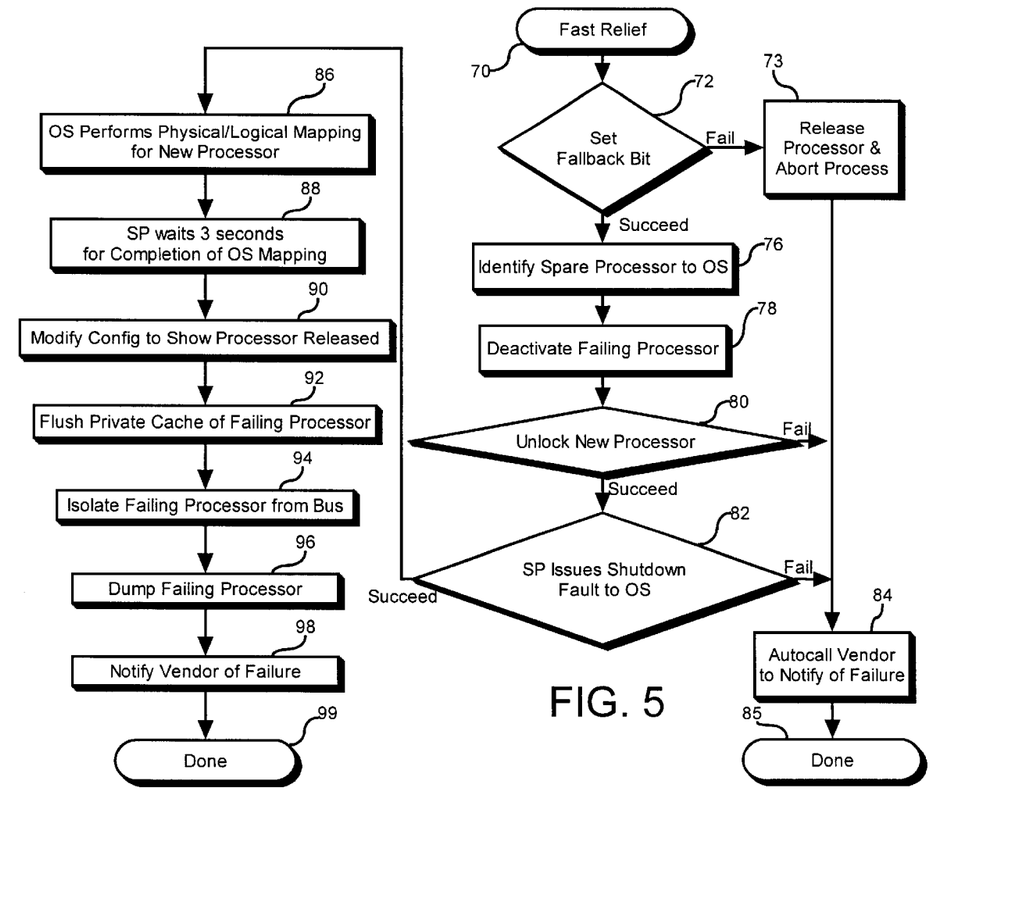
FIG. 5 is a flow chart that illustrates Fast Relief processing for a failing processor, in accordance with a preferred embodiment of the present invention.

FIG. 5 is a flow chart that illustrates Fast Relief processing for a failing processor 2, in accordance with a preferred embodiment of the present invention. When Fast Relief is attempted, step 70, an attempt is made to set the fallback bit for the failing processor 2, step 72. If the write to RMS 44 fails, the fallback bit is not set, or communication to the OS is considered disabled, the Service Processor 21 will make an Auto Call 46 to the vendor, Step 84, and record the failure in a log file 49 preferably stored on a disk 48 in the SP 21. The failing processor 2 will be considered released, step 73, and the Operating System will abort the currently executing process on the failing processor 2. If that process is the operating system itself, the system will crash.

The SP 21 will then identify the physical ID of a selected spare processor 8 to the OS, step 76. The processor number of the replacement processor is written to a reserved location in the RMS 44, with one entry for each possible processor in the system. This signals the OS to do a Fast Relief. The Config bit in the RMS 44 location for the processor 2 being swapped out is reset. The processor connect word for the new processor 8 is set. If the write to the RMS 44 fails, the assignment of the spare processor 8 cannot be completed. The SP 21 will then Auto Call the vendor and log the fault, step 84, and processing is complete, step 85.

If the write to RMS 44 did not fail, the SP 21 will then deactivate the failing processor 2 by issuing a "Lock" command to the lock/unlock routine, step 78. If the Lock fails, the vendor is Auto Called 46 to warn about the problem.

An attempt is then made to Unlock the new processor 8, step 80. The SP 21 issues an UNLOCK command to the lock/unlock routine. If the Unlock command is rejected, processing will continue as if a spare processor could not be assigned for swapping.

The SP 21 then issues a Shutdown fault to the OS indicating the failed processor 2, step 82. If the fault execution fails, bad status is returned from the CMU 27 or hardware, or communication with the OS is considered disabled, the SP 21 will Auto Call 46 the vendor and record the fault in its log file 49, step 84, and will complete processing, step 85. No other processing is done in that case, including System Disaster processing. The Intercept Process had previously set the Relief flag indicating that Relief was possible. Without receiving the Shutdown fault from the SP 21, the OS cannot process a Release request.

If the Shutdown fault is successful and is received by the OS, the OS will perform a physical/logical mapping of the new processor 8, step 86 from the information supplied in the reserved location in the RMS 44 for the failed processor 2. The OS will do a logical "swap start" similar to what is done when a processor is assigned. The OS will update the RMS 44 to indicate that the new processor 8 is known. The OS will update the camp control words to remove the failed processor 2 and add the new processor 8. The OS will then clear the Relief indicator in RMS 44. The OS will also clear the Fast Relief indicator in RMS 44 for the failed processor 2.

The SP 21 will then wait for three (3) seconds for the completion of the OS physical/logical mapping, step 88. This is done to allow the OS time to retrieve all data from the failing processor 2 before the SP 21 proceeds with isolating that processor from the system 100.

The SP 21 will then modify its configuration file 47 to show the failing processor 2 as Released, step 90. The Connect word for that processor 2 is reset by the OS.

The SP 21 will then flush the private cache 25 of the failing processor 2, step 92. This is done because once the failing processor 2 is isolated from the cache bus 10 (see step 94 below), all private data in the private cache 25 of that processor 2 becomes unavailable to the other processors 4, 6, 8 in the system—. If the private cache flush fails, there will be no continued process of isolating the processor 2. The processor 2 should preferably not be disconnected because to do such may cause a system interruption. The vendor is Auto Called 46 about the processor error.

The SP 21 then isolates the failing processor 2 from the cache bus 10, step 94. If the bus isolation fails, processing preferably will not continue. The processor 2 is not disconnected then as it may cause a system interruption.

The failing processor 2 is then dumped, if possible, step 96. If the dump fails, it will be recorded by the SP 21 in its log file 49. Processing will then be considered complete.

Finally, the vendor is Auto Called 46 about the processor 2 failure, step 98, and the process is complete, step 99. This is an informational call, made so that the processor problem can be logged and tracked. However, since the failing processor 2 was successfully replaced, the urgency of fixing or replacing the failing processor 2 is significantly reduced. If it is determined that the processor board 1 containing the failing processor 2 should be replaced, it can be done during scheduled maintenance.

The actual fault and program recovery mechanism is disclosed more fully in the above cited references incorporated herein by reference and is well known in the prior art. The failing processor 2 will generate a safestore stack frame containing its registers and environment at the time of failure. It will typically contain sufficient information to allow for instruction retry of the instruction that failed upon recovery. The replacement processor 8 will "OCLIMB" utilizing the contents of that safestore frame to restore the failing processor's 2 environment at the time of instruction failure, and will then retry the failed instruction. This fault/OCLIMB mechanism (within a given processor) is well known in the prior art and is a standard feature of the GCOS 8 operating system sold by the assignee of this invention.

Those skilled in the art will recognize that modifications and variations can be made without departing from the spirit of the invention. Therefore, it is intended that this invention encompass all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

What is claimed is:

1. A method of swapping a replacement processor for a failing processor in a computer system with a plurality of processors, wherein said replacement processor is included as one of said plurality of processors, wherein:
   said method comprises:
   A) receiving a fault indication in a first of the plurality of processors as the failing processor in response to a failure by the failing processor to execute a failed instruction in an instruction stream;
   B) saving a set of registers and environmental information for the failing processor in a shared memory, shared by said plurality of processors which includes said replacement processor;
   C) selecting a second of the plurality of processors as the replacement processor, wherein:
   the replacement processor was not assigned prior to the selecting, and wherein;

the step of selecting gives preference to a replacement processor sharing said shared memory with the failing processor over other replacement processors D) restoring the set of registers and environmental information to the replacement processor from the shared memory; and E) executing the instruction stream by the replacement processor starting with the failed instruction.

2. The method in claim 1 wherein:

the selecting in step (C) selects a reserved processor as the replacement processor.

3. The method in claim 1 wherein:

the method further comprises:
F) marking the failing processor as unavailable in a configuration.

4. The method in claim 1 wherein:

the method further comprises:
F) disconnecting the failing processor from a bus.

5. The method in claim 1 wherein:

the method further comprises:
F) flushing a private cache memory in the failing processor.

6. The method in claim 1 wherein:

the method further comprises:
F) dumping the failing processor.

7. The method in claim 1 wherein:

the method further comprises:
F) automatically communicating with a remote location to notify the remote location of the failing processor.

8. The method in claim 1 wherein:

the method further comprises:
F) starting the replacement processor after it has been selected.

9. The method in claim 1 wherein said shared memory is a cache memory.

10. The method in claim 1 wherein:

the method further comprises:
F) halting the failing processor after the failing processor has saved the set of registers and environmental information in step (B).

11. The method in claim 1 wherein:

the method further comprises:
F) notifying a service processor of the failing processor; and
G) receiving a fault from the service processor indicating a swap to the replacement processor.

12. The method in claim 1 wherein:

the method further comprises:
F) logically mapping the replacement processor as the failing processor.

13. The method in claim 1 wherein:

the method further comprises:
F) physically mapping the replacement processor as the failing processor.

14. The method in claim 1 wherein:

the method further comprises:
F) testing whether a Relief is possible before selecting the replacement processor in step (C).

15. The method in claim 1 wherein:

the method further comprises:
F) testing whether a Fast Relief is requested before selecting the replacement processor in step (C).

16. The method in claim 1 wherein:

the method further comprises:
F) utilizing an intercept process to process the fault indication.

17. A method as in claim 1 wherein said plurality of processors and said shared memory are housed on the same circuit board.

18. A method as in claim 1 wherein said plurality of processors are coupled to said shared memory over a dedicated processor bus.

19. A method as in claim 18 wherein said method is executed in a system having more than one said plurality of processors.

* * * * *